(12) United States Patent
Yang

(10) Patent No.: US 12,458,140 B1
(45) Date of Patent: Nov. 4, 2025

(54) ROTATABLE LIFTING STORAGE DEVICE

(71) Applicant: Hongyuan Yang, Dongtai (CN)

(72) Inventor: Hongyuan Yang, Dongtai (CN)

( * ) Notice: Subject to any disclaimer, the term of this patent is extended or adjusted under 35 U.S.C. 154(b) by 0 days.

(21) Appl. No.: 19/083,775

(22) Filed: Mar. 19, 2025

(30) Foreign Application Priority Data

Oct. 24, 2024 (CN) .......................... 202422584196.5

(51) Int. Cl.
  *A47B 49/00* (2006.01)
(52) U.S. Cl.
  CPC .................................. *A47B 49/004* (2013.01)
(58) Field of Classification Search
  CPC ..... A47B 49/004; A47B 49/00; A47B 63/062; A47B 57/54; A47B 2063/005; A47B 57/26; A47B 57/30; A47F 5/04; A47F 5/0087; A47F 5/06; A47F 5/02; A47F 5/05; A47F 5/08; F16M 13/022; F16M 2200/024; B65D 25/22
  See application file for complete search history.

(56) References Cited

U.S. PATENT DOCUMENTS

| | | | | |
|---|---|---|---|---|
| 284,090 A | * | 8/1883 | Tingle | A47G 7/041 248/315 |
| 496,173 A | * | 4/1893 | Smith | A47F 7/283 211/75 |
| 1,443,420 A | * | 1/1923 | Lennox | A47G 7/044 211/75 |
| 3,194,403 A | * | 7/1965 | Horn, Jr. | A47F 5/04 D7/619.1 |
| D205,848 S | * | 9/1966 | Poole | D6/512 |
| 4,562,987 A | * | 1/1986 | Leeds | F16M 11/2014 248/920 |
| 4,687,167 A | * | 8/1987 | Skalka | A47B 21/0314 108/103 |
| 5,046,880 A | * | 9/1991 | Steinhilber | F16M 11/10 403/109.5 |
| 5,485,793 A | * | 1/1996 | Crowell | A47B 23/04 108/44 |
| 5,653,499 A | * | 8/1997 | Goodall | A47B 83/02 297/173 |
| 5,931,102 A | * | 8/1999 | Grahl | F16M 11/2014 248/278.1 |

(Continued)

FOREIGN PATENT DOCUMENTS

GB    2298569 A    *  9/1996    ............ A47B 21/03

*Primary Examiner* — Hiwot E Tefera

(74) *Attorney, Agent, or Firm* — Birchwood IP

(57) ABSTRACT

A rotatable lifting storage device is provided, which includes a column, a bottom end of the column is provided with a base, a bottom of the base is provided with a clamp seat, one surface of the column is provided with an adjustable seat that can slide up and down. One side thread of the adjustable seat is provided with a third positioning screw, one surface of the adjustable seat is provided with a rotating seat, one surface thread of the rotating seat is provided with a fourth positioning screw. One side of the rotating seat is provided with a support arm, one end of the support arm away from the column is provided with a storage tray. A top of the storage tray is fixedly provided with a protective frame, heights of a plurality of storage trays can be simultaneously adjusted through the column with an adjustable length.

9 Claims, 14 Drawing Sheets

(56) References Cited

U.S. PATENT DOCUMENTS

| | | | | |
|---|---|---|---|---|
| 6,481,586 | B1* | 11/2002 | Hoff | A47B 57/26 |
| | | | | 211/90.02 |
| 6,621,646 | B2* | 9/2003 | Jung | G02B 25/002 |
| | | | | 359/822 |
| 9,511,786 | B1* | 12/2016 | Hickcox | B62B 5/0083 |
| 11,754,217 | B2* | 9/2023 | Leman | F16M 13/022 |
| | | | | 248/442.2 |
| 11,802,657 | B2* | 10/2023 | Hsieh | F16M 11/2014 |
| 2004/0108282 | A1* | 6/2004 | Fynn | A47B 17/03 |
| | | | | 211/11 |
| 2011/0127228 | A1* | 6/2011 | Sagel | A47B 49/004 |
| | | | | 211/144 |
| 2012/0031860 | A1* | 2/2012 | Goode | A47F 5/02 |
| | | | | 211/41.1 |
| 2018/0344025 | A1* | 12/2018 | Corbo | A47B 21/04 |
| 2020/0261294 | A1* | 8/2020 | Lao | F16M 11/08 |
| 2023/0114541 | A1* | 4/2023 | Handley | A47B 9/14 |
| | | | | 108/97 |

* cited by examiner

ROTATABLE LIFTING STORAGE DEVICE

CROSS-REFERENCE TO RELATED APPLICATIONS

This application claims priority to Chinese Patent Application No. 202422584196.5, filed on Oct. 24, 2024, which is hereby incorporated by reference in its entirety.

TECHNICAL FIELD

The present disclosure relates to the field of storage rack technologies, and in particular, to a rotatable lifting storage device.

BACKGROUND

With the continuous improvement of people's living standards, there are more and more daily necessities in the home. Many times, people are very worried about how to put these items, so an application of shelves in family life is becoming more and more widespread. The existing storage shelves mostly use two supporting pallets to support one storage board.

However, the above method still has the following drawbacks in practical use: its storage board is fixed in position after assembly, rendering it difficult to adjust a storage height of the opposite storage board, and a distance between adjacent storage boards is fixed, rendering it difficult to place some items with higher heights.

SUMMARY

The purpose of the present disclosure is to provide a rotatable and adjustable storage device, which has effects of flexible adjustment and convenient installation.

The above technical objective of the present disclosure is achieved through the following technical solution: a rotatable lifting and lowering storage device, including a column, where a bottom end of the column is provided with a base, a bottom end of the base is provided with a clamp seat; one surface of the column is provided with an adjustment seat that is capable of sliding up and down; by the adjustment seat, it is compatible with clamping different thicknesses of board surfaces; one side thread of the adjustment seat is provided with a third positioning screw, one surface of the adjustment seat is rotatably provided with a rotating seat, one side of the rotating seat is provided with a support arm, one end of the support arm away from the column is provided with a storage tray; a top of the storage tray is fixedly provided with a protective frame, and the storage tray is provided with a protective pad inside.

In some embodiments of the present disclosure: the clamp seat includes a side plate and a bottom plate, the side plate is fixedly provided on one side of the base, the bottom plate is a L-shape, one side of the bottom plate is slidably connected to the side plate, a bottom end of the bottom plate is fixedly provided with a second threaded seat, an internal thread of the second threaded seat is provided with a second positioning screw; a top end of the second positioning screw is fixedly provided with a clamp plate, and a bottom end of the second positioning screw is fixedly provided with an operating handle, it is convenient to rotate the second positioning screw.

In some embodiments of the present disclosure, one surface of the side plate and one side of the bottom plate are provided with a plurality of first mounting holes, adjacent first mounting holes are connected by a first mounting bolt.

In some embodiments of the present disclosure: one side of the adjustment seat is fixedly provided with a third threaded seat, and the third threaded seat is threaded connected to the third positioning screw; one surface of the adjustment seat is fixedly provided with a second annular rotating plate, an interior of the rotating seat is provided with a second rotating groove that cooperates with the second rotating plate; one surface thread of the rotating seat is provided with a fourth positioning screw, one side of the rotating seat is fixedly provided with a fourth threaded seat, the fourth threaded seat is threaded connected to the fourth positioning screw.

In some embodiments of the present disclosure, the column is composed of a support column and an adjustment column; the support column is rotatably provided in a middle of a top of the base; one surface of the support column is provided with an external thread, and a bottom of the adjustment column is provided with a threaded groove that is threaded connected to the external thread.

In some embodiments of the present disclosure: a bottom of the support column is fixedly provided with a first annular rotating plate; a middle of a top of the base is fixedly provided with an installation seat; an interior of the installation seat is provided with a first rotating groove that cooperates with the first rotating plate; one side of the installation seat is fixedly provided with a first threaded seat, and an internal thread of the first threaded seat is provided with a first positioning screw.

In some embodiments of the present disclosure, one surface of the adjustment column is provided with a guide groove; the adjustment seat is sleeved on an outer side of the adjustment column; an inner side of the adjustment seat is provided with a guide block that cooperates with the guide groove.

In some embodiments of the present disclosure: the support arm includes a support frame and a support plate, the support frame is rotatably provided on one side of the rotating seat, the support plate is slidably connected to an interior of the support frame; one side of the support plate and one side of the support frame are provided with a plurality of second mounting holes; adjacent two second mounting holes are connected to a second mounting bolt; one end of the support plate away from the adjustment column is fixedly provided with a fixing frame, a top of the fixing frame is fixedly provided with a fixing seat, a middle of a bottom of the storage tray is provided with an installation groove corresponding to the fixing seat; the fixing seat is embedded inside the installation groove, and the fixing seat is connected to a bottom end of the storage tray through a fixing screw.

In some embodiments of the present disclosure, one side of the rotating seat is fixedly provided with a connection seat, one end of the support frame close to the adjustment column is fixedly provided with a fifth positioning screw; one surface of the connection seat is provided with a through hole corresponding to the fifth positioning screw, and one surface of the fifth positioning screw is threaded connected to a locking nut.

In some embodiments of the present disclosure, a contraction groove is provided on one side of the rotating seat and below the support frame; a limit seat is provided in the contraction groove, and the limit seat is a T-shape, two ends of the limit seat are connected to an inner side of the contraction groove through a connection spring.

In summary, the present disclosure has the following beneficial effects: by setting a column with an adjustable length, heights of a plurality of storage trays can be adjusted simultaneously, and the adjustment seat is sleeved on the surface of the column to install the plurality of storage trays. At the same time, the height of each storage tray can be adjusted separately, and an adjustment range is wider. It can place items of different heights and can also be used as a pet climbing frame. The support arm with an adjustable length can adjust the position of the storage tray, thereby expanding a storage range of the storage tray. The support arm is also designed as a foldable structure, which can be folded to one side of the column when not in use, thereby reducing an occupied space. A rotation connection between the column and the base can drive the plurality of storage trays to rotate synchronously, and the rotating seat is installed on the adjusting seat to rotate the storage tray separately. A storage direction of the storage tray can be adjusted to render adjacent storage trays to be staggered, which has a wider application range.

BRIEF DESCRIPTION OF DRAWINGS

In order to provide a clearer explanation of the technical solution of the embodiments of the present disclosure, a brief introduction will be given below to the accompanying drawings required for use in the embodiments. It should be understood that the following drawings only illustrate some embodiments of the present disclosure and should not be considered as limiting the scope. For those skilled in the art, other relevant drawings can be obtained based on these drawings without creative work.

Numeral reference: 1 column; 101 support column; 102 external thread; 103 adjustment column; 104 threaded groove; 105 guide groove; 106 first rotating plate; 2 base; 201 installation seat; 202 first rotating groove; 203 first threaded seat; 204 first positioning screw; 3 clamp seat; 301 side plate; 302 bottom plate; 303 second threaded seat; 304 second positioning screw; 305 clamp plate; 306 operating handle; 307 first mounting hole; 308 first mounting bolt; 4 adjustment seat; 401 guide block; 402 third threaded seat; 403 third positioning screw; 404 second rotating plate; 5 rotating seat; 501 second rotating groove; 502 fourth threaded seat; 503 fourth positioning screw; 504 connection seat; 6 support arm; 601 support frame; 602 fifth positioning screw; 603 locking nut; 604 support plate; 605 second mounting hole; 606 second mounting bolt; 607 fixing frame; 608 fixing seat; 609 contraction groove; 6010 limit seat; 6011 connection spring; 7 storage tray; 701 protective frame; 8 protective pad.

DESCRIPTION OF EMBODIMENTS

In order to facilitate the understanding of the present disclosure, a more comprehensive description of the present disclosure will be provided below with reference to the relevant drawings. The preferred embodiment of the present disclosure is shown in the accompanying drawings. However, the present disclosure can be implemented in many different forms and is not limited to the embodiments described herein. On the contrary, the purpose of providing these embodiments is to provide a more thorough and comprehensive understanding of the disclosed content of the present disclosure.

It should be noted that when a component is referred to as "fixed to" another component, it can be directly on the other component or there can also be a centered component. When a component is referred to be "connected" to another component, it can be directly connected to another component or there may be a central component present at the same time. Terms "vertical", "horizontal", "left", "right" and similar expressions used in this specification are for an illustrative purpose only and do not represent the only implementation mode.

Unless otherwise defined, all technical and scientific terms used in this specification have the same meanings as those commonly understood by those skilled in the art belonging to the present disclosure. The terms used in this specification of the present disclosure are only for a purpose of describing specific embodiments and are not intended to limit the present disclosure. Term "and/or" used in this specification includes any and all combinations of one or more related listed items.

Figure 1:
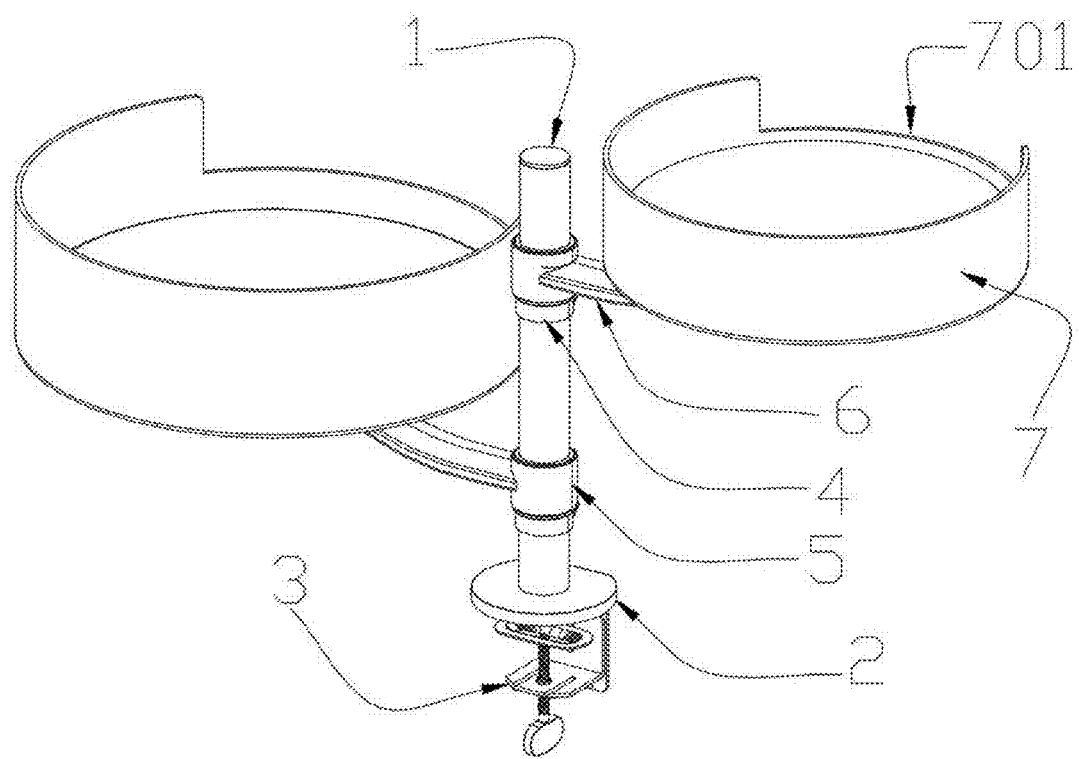
FIG. 1 is a first three-dimensional structure schematic diagram of a first embodiment of the present disclosure.
Figure 2:
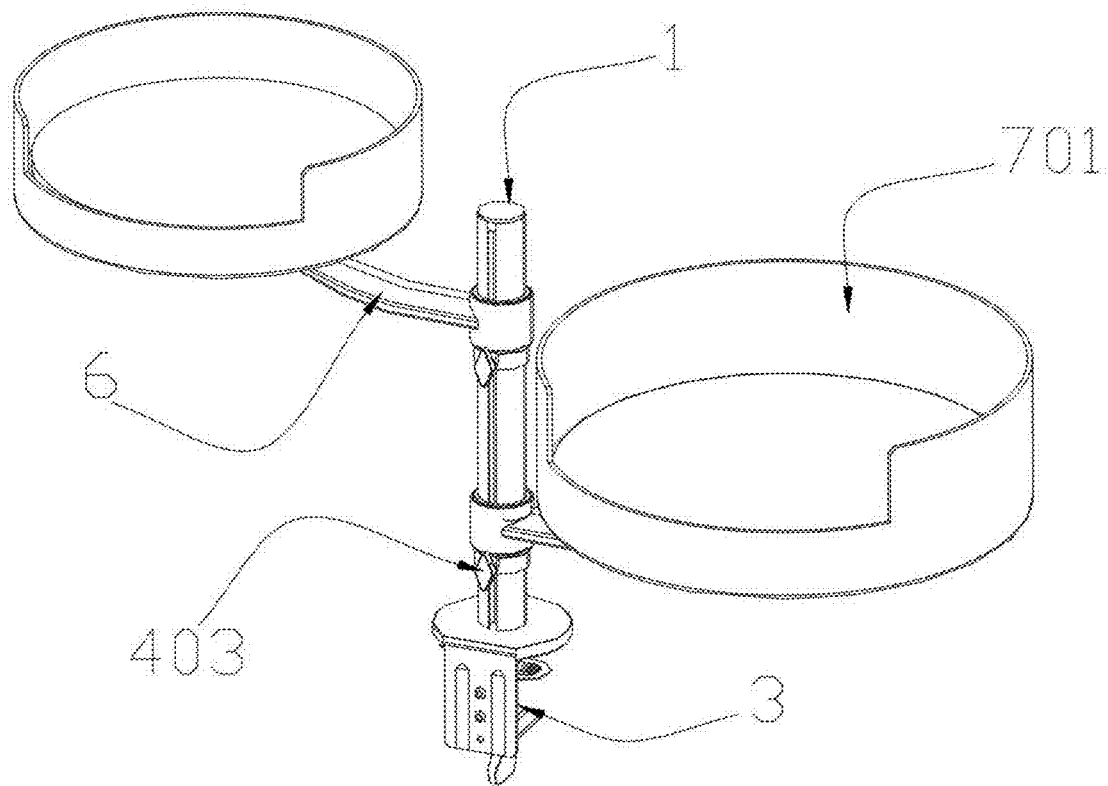
FIG. 2 is a second three-dimensional structure schematic diagram of the first embodiment of the present disclosure.
Figure 3:
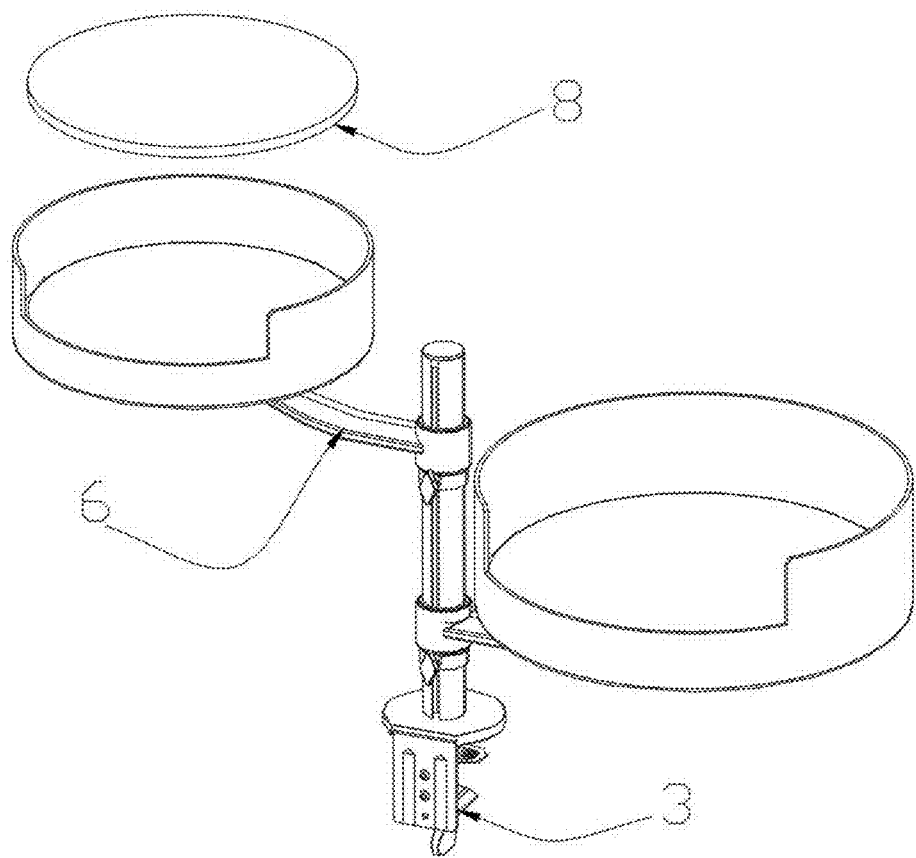
FIG. 3 is a third three-dimensional structure schematic diagram of the first embodiment of the present disclosure.
Figure 4:
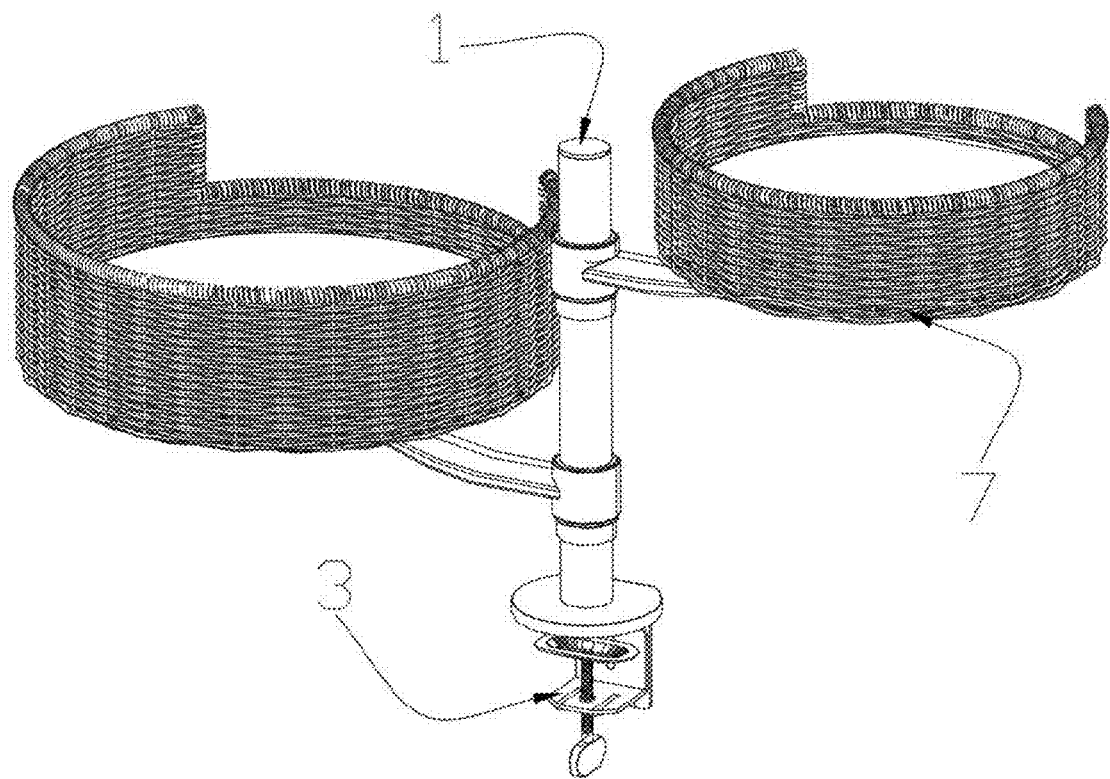
FIG. 4 is a fourth three-dimensional structure schematic diagram of the first embodiment of the present disclosure.
Figure 5:
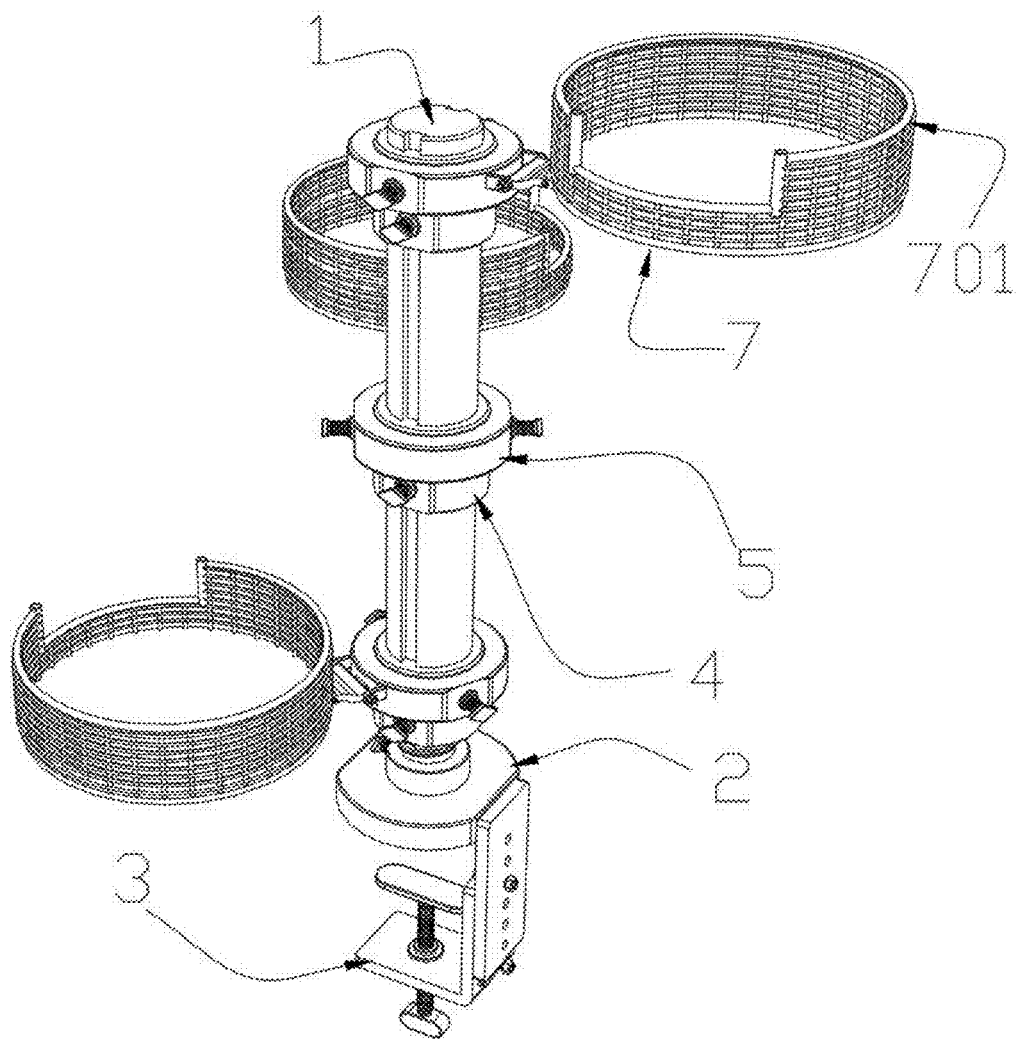
FIG. 5 is a first three-dimensional structure schematic diagram of a second embodiment of the present disclosure.
Figure 6:
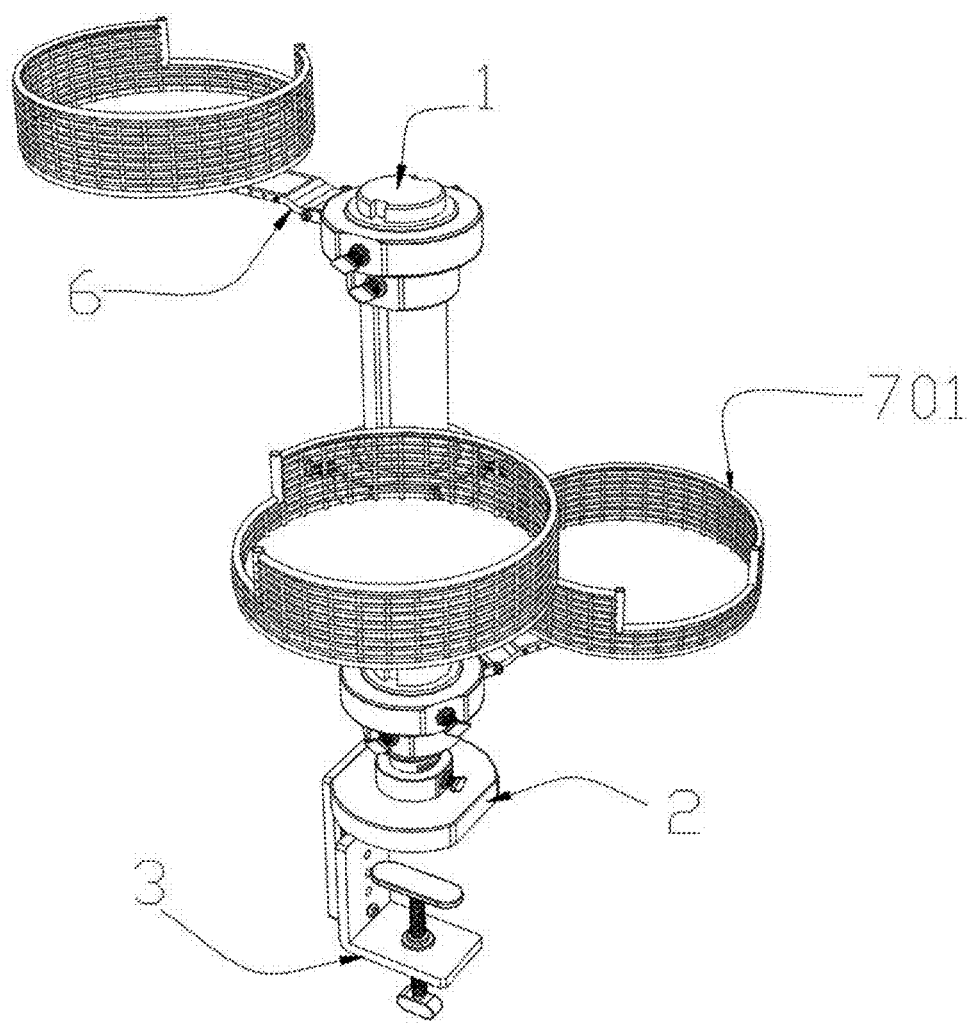
FIG. 6 is a second three-dimensional structure schematic diagram of the second embodiment of the present disclosure.
Figure 7:
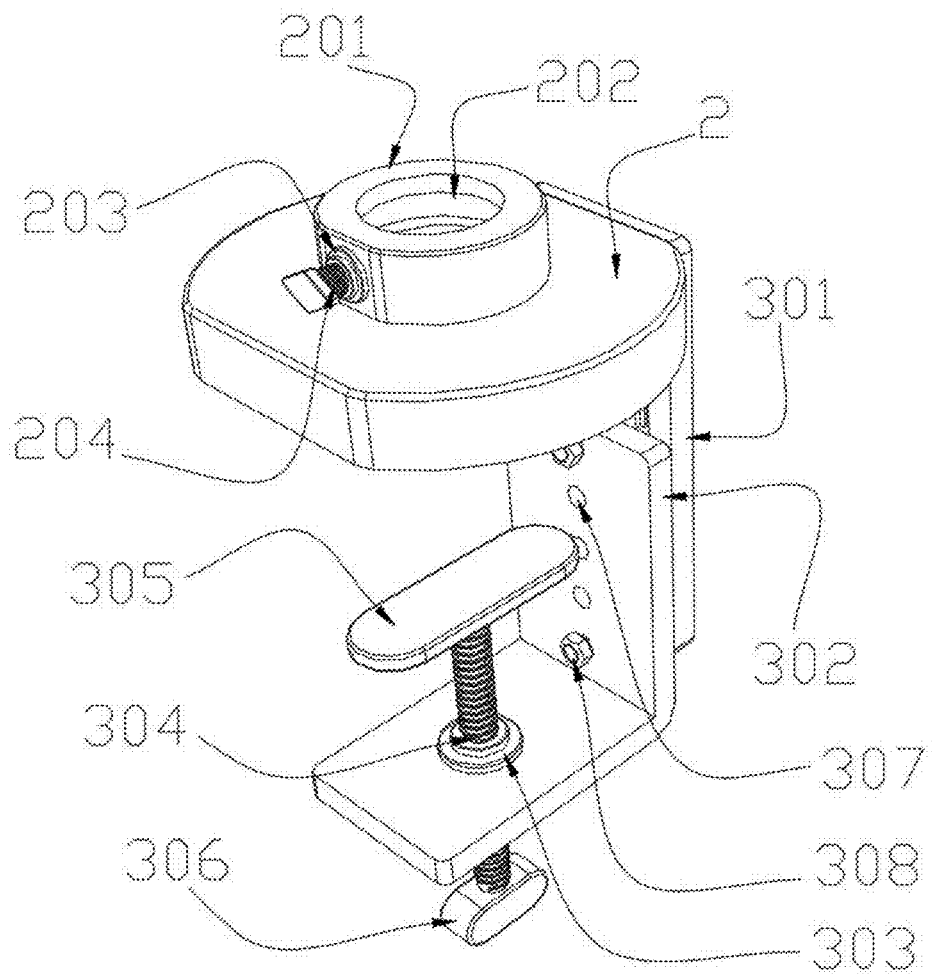
FIG. 7 is a schematic structure diagram of a clamp seat of the present disclosure.
Figure 8:
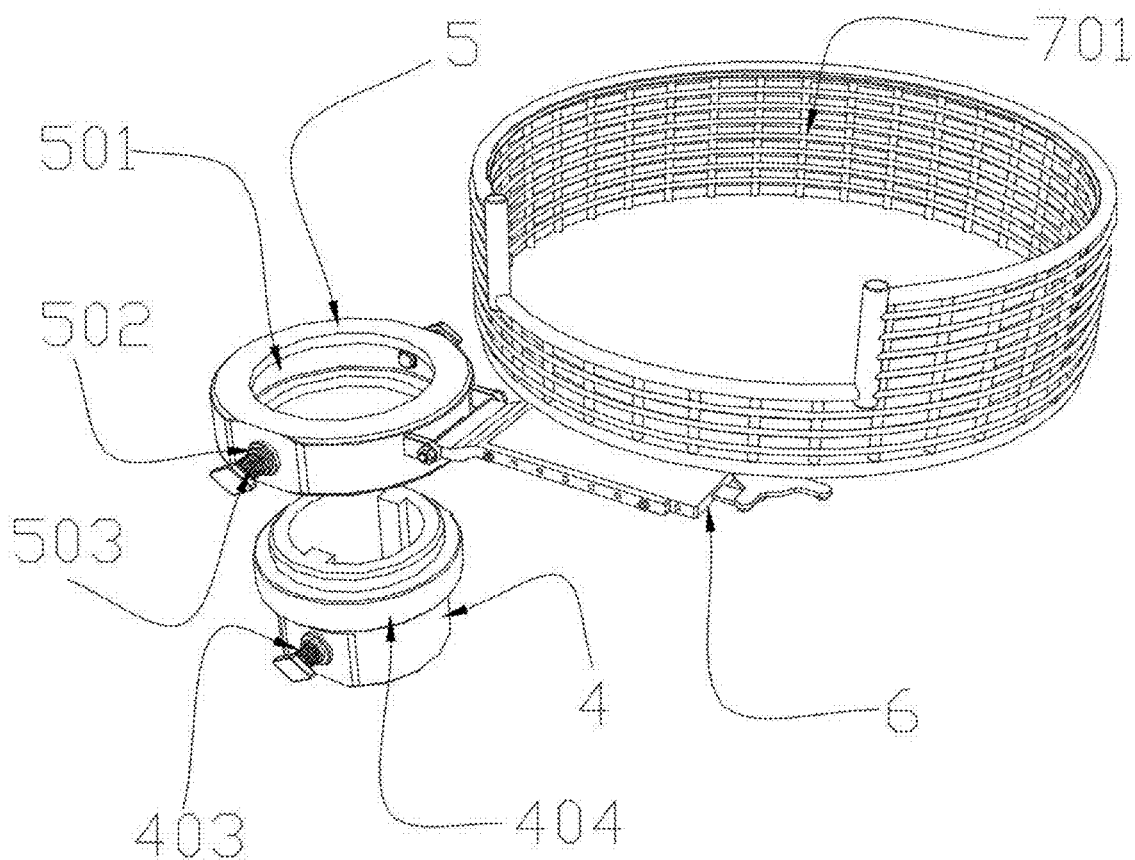
FIG. 8 is a first partial explosion structure schematic diagram of the present disclosure
Figure 9:
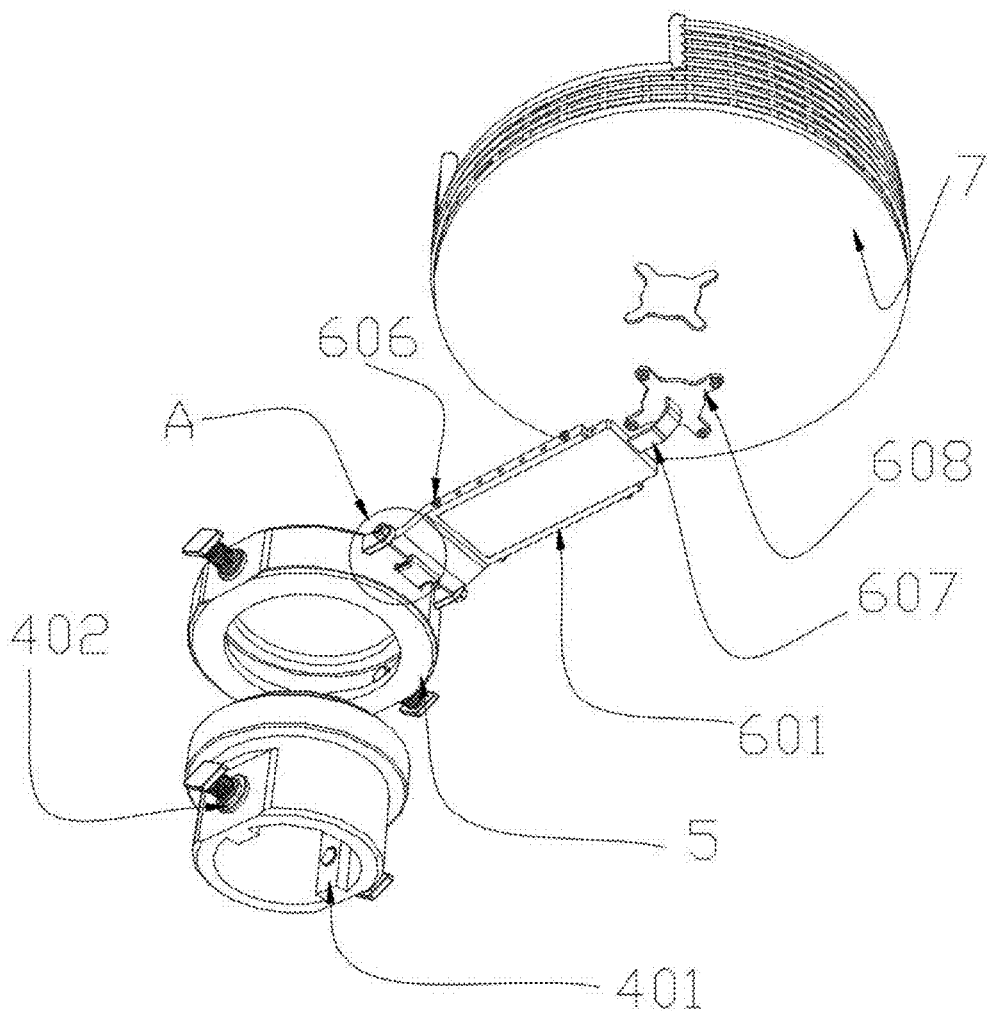
FIG. 9 is a second partial explosion structure schematic diagram of the present disclosure.
Figure 10:
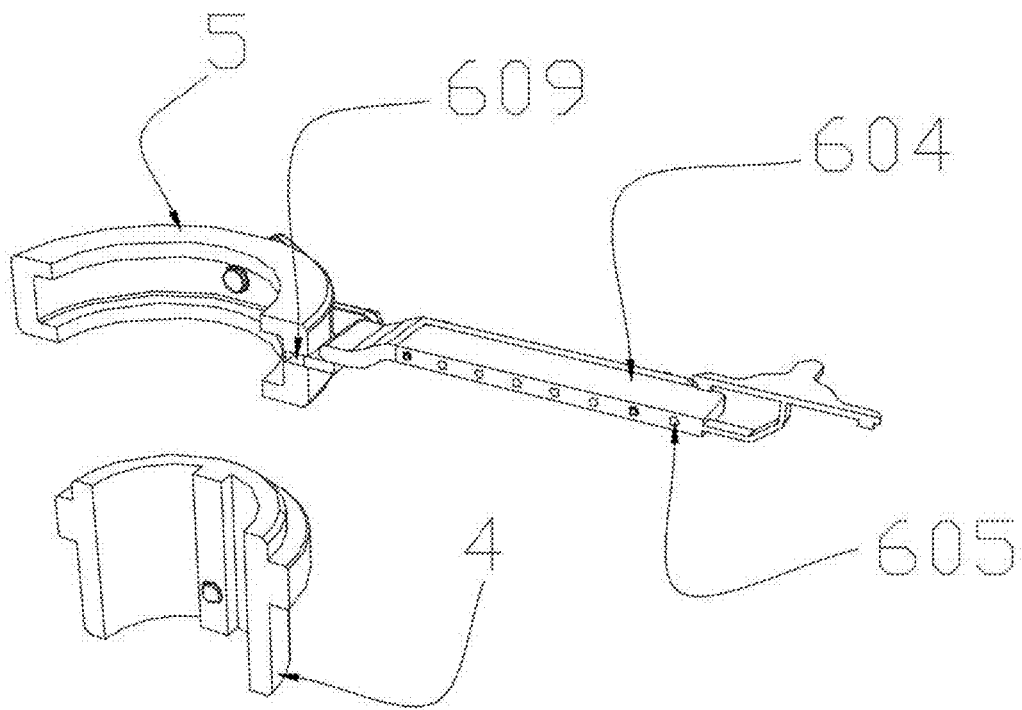
FIG. 10 is a schematic diagram of a cross-sectional structure of an adjustment seat and a rotating seat of the present disclosure.
Figure 11:
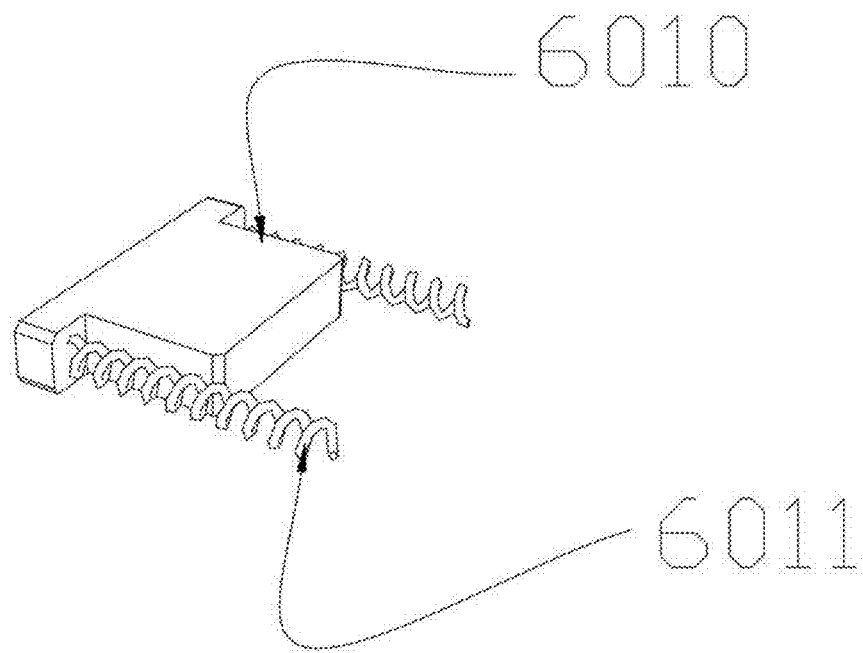
FIG. 11 is a schematic structural diagram of a limit seat of the present disclosure.
Figure 12:
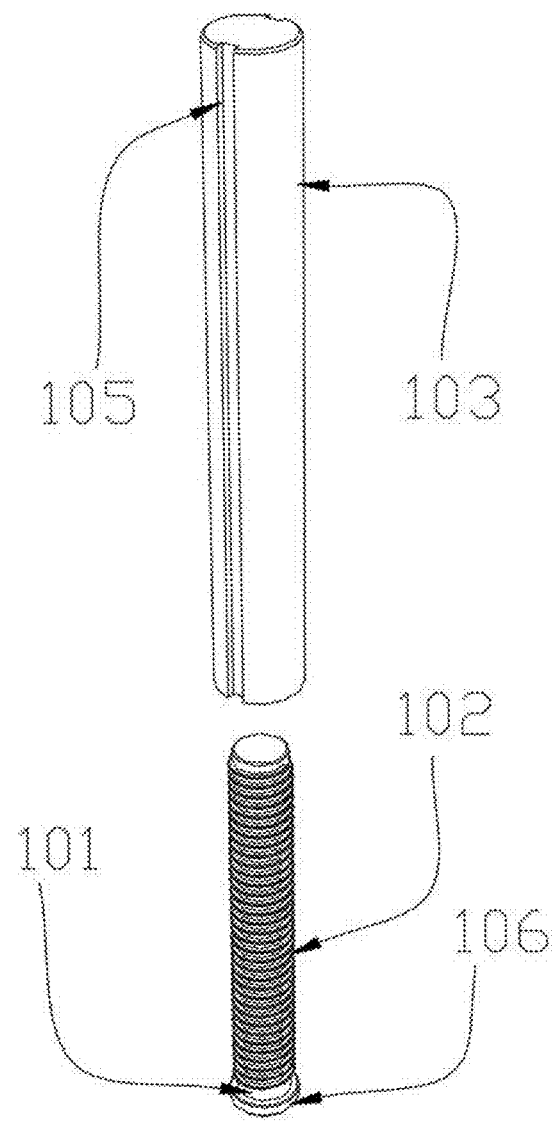
FIG. 12 is a schematic structural diagram of a support column separated from an adjustment column according to the present disclosure.
Figure 13:
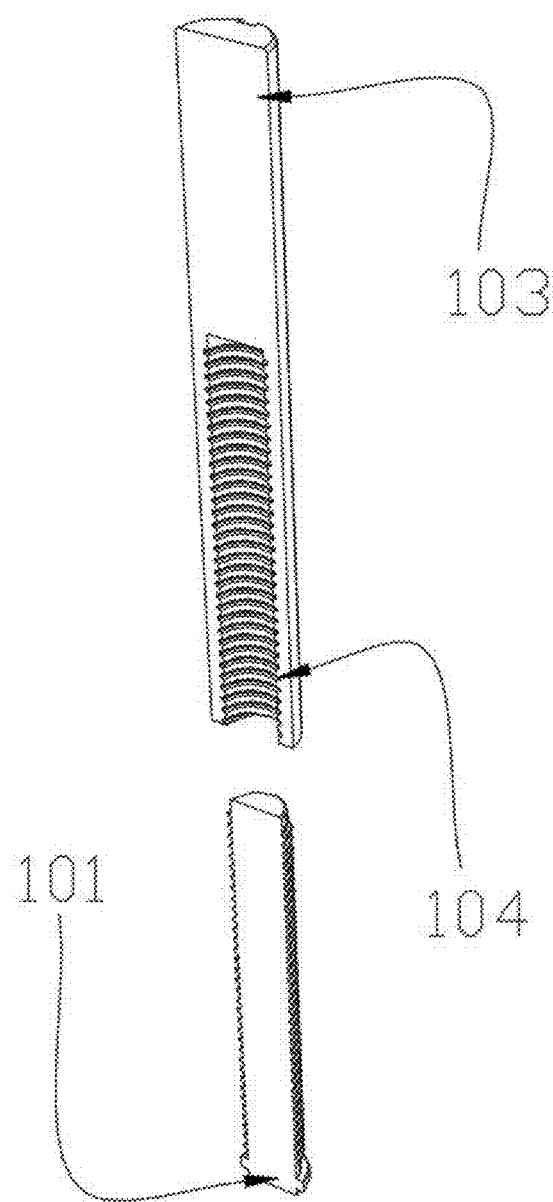
FIG. 13 is a schematic diagram of a cross-sectional structure of FIG. 10 according to the present disclosure.
Figure 14:
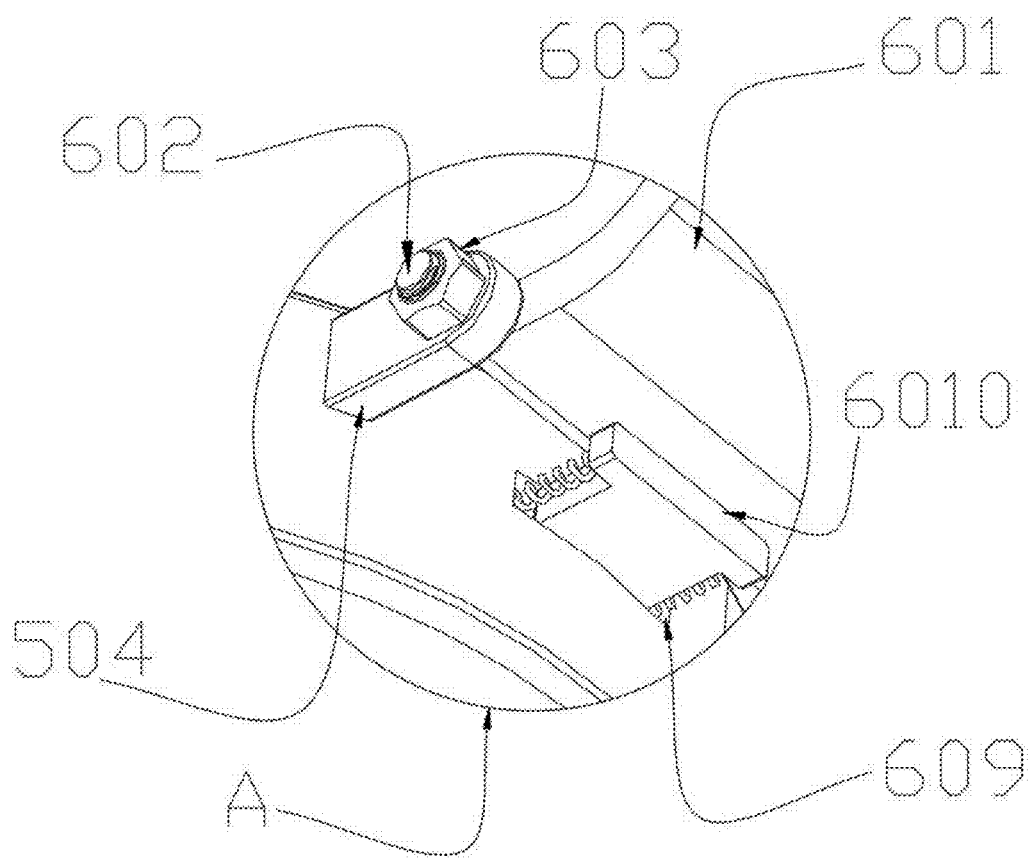
FIG. 14 is an enlarged structure schematic diagram of part A in FIG. 7 of the present disclosure.

Please refer to FIGS. 1-4. In an embodiment of the present disclosure, a rotatable and adjustable storage device includes a column 1, a height of column 1 can be adjusted. A bottom end of the column 1 is provided with a base 2, a bottom end of the base 2 is provided with a clamp seat 3. The clamp seat 3 can be stably clamped on a tabletop of a table to limit a position of this device. One surface of the column 1 is provided with an adjustment seat 4 that can slide up and down. A height of a storage tray 7 can be adjusted by using the adjustment seat 4 that can slide up and down, so as to adjust a distance between adjacent adjustment seats 4 and place items of different heights. One side thread of the adjustment seat 4 is provided with a third positioning screw 403, a threaded connected third positioning screw 403 can be used to clamp an internal column 1, thereby limiting the position of the adjustment seat 4 and maintaining a stability. One surface of the adjustment seat 4 is rotatably provided with a rotating seat 5. The rotating seat 5 can be used to adjust a direction of a corresponding storage tray 7, so that storage trays 7 that are at an upper and a lower are staggered and do not interfere with each other. The number of the storage tray 7 can be set according to needs, so that the storage device is branched shape as a whole. A knob is provided at an end of the third positioning screw 403 to control a rotation of a third positioning screw 403. One side of the rotating seat 5 is provided with a support arm 6, a length of the support arm 6 is adjustable, and a distance between the storage tray 7 and the column 1 can be adjusted. One end of the support arm 6 away from the column 1 is provided with the storage tray 7. A protective frame 701 is fixedly provided at a top of the storage tray 7 to protect the items on the storage tray 7. At the same time, there is a notch on one surface of the protective frame 701 near an upper position for easy access and placement of items, and it can also be used as a pet climbing tool, as a landing point of jump. The storage tray 7 is provided with a protective pad 8. As shown in FIGS. 1 to 3, the protective frame 701 is integrally formed, and as shown in FIG. 4, the protective frame 701 is woven. In this embodiment, a storage space formed by the storage tray 7 and the protective frame 701 is not only used to hold items, but also serves as a cat climbing frame. When used as the cat climbing frame, the number of the adjustment seat 4, the rotating seat 5, the support arm 6, the storage tray 7, and the protective frame 701 can be set according to actual needs, thereby achieving a multi-level effect and increasing a space for pet cats to move.

In this embodiment, the clamp seat 3 includes a side plate 301 and a bottom plate 302. The side plate 301 is fixedly provided on one side of the base 2, and the bottom plate 302 is a L-shape. One side of the bottom plate 302 is slidably connected to the side plate 301, one side of the bottom plate 302 is fixedly provided with a slider. An inner side of the side plate 301 is provided with a sliding groove that cooperates with the slider; a movement of the bottom plate 302 is guided through a sliding corporation of the sliding groove and the slider. A bottom end of the bottom plate 302 is fixedly provided with a second threaded seat 303, an internal thread of the second threaded seat 303 is provided with a second positioning screw 304. A top of the second positioning screw 304 is fixedly provided with a clamp plate 305, and a bottom end of the second positioning screw 304 is fixedly provided with an operating handle 306. The operating handle 306 controls the second positioning screw 304 to rotate, under a thread cooperation between the second positioning screw 304 and the second threaded seat 303, the clamp plate 305 at a top is driven to move, and the clamp plate 305 is stably clamped on the table by a cooperation between the clamp plate 305 and the base 2.

In this embodiment, one surface of the side plate 301 and one side of the bottom plate 302 are provided with a plurality of first mounting holes 307, and adjacent first mounting holes 307 are connected by a first mounting bolt 308. After adjusting a position of the bottom plate 302, the first mounting hole 307 on the surface of the side plate 301 corresponds to the first mounting hole 307 on the side of the bottom plate 302. The first mounting bolt 308 is used to connect adjacent first mounting holes 307, thereby fixing a connection between the side plate 301 and the bottom plate 302.

Please refer to FIGS. 3-12. In an embodiment of the present disclosure, the column 1 is composed of a support column 101 and an adjustment column 103. A distance between the support column 101 and the adjustment column 103 is adjustable, so that a height of the column 1 can be adjusted. It is suitable for more scenarios. The support column 101 is rotatably provided in a middle of a top of the base 2, so that the column 1 can be rotated as a whole and simultaneously rotate the plurality of storage trays 7. One surface of the support column 101 is provided with an external thread 102, and a bottom of the adjustment column 103 is provided with a threaded groove 104 that is threaded connected to the external thread 102. A thread fit between the threaded groove 104 and the external thread 102 can drive the adjustment column 103 to move up and down in a spiral, thereby adjusting a distance between the support column 101 and the adjustment column 103.

In this embodiment, one side of the adjustment seat 4 is fixedly provided with a third threaded seat 402, and the third threaded seat 402 is threaded connected to the third positioning screw 403. The side of the adjustment seat 4 is set as a flat surface, rendering an installation of the third threaded seat 402 more convenient. A through hole corresponding to the third positioning screw 403 is provided on an inner side of the adjustment seat 4, so that the end of the third positioning screw 403 can pass through and clamp the adjustment column 103, thereby limiting the position of the adjustment seat 4. The surface of the adjustment seat 4 is fixedly provided with a second annular rotating plate 404, and an interior of the rotating seat 5 is provided with a second rotating groove 501 that cooperates with the second rotating plate 404. By using a rotation cooperation between the second rotating plate 404 and the second rotating groove 501, which has a guide role in a rotation of the rotating seat 5. One surface thread of the rotating seat 5 is provided with a fourth positioning screw 503, a threaded connected fourth positioning screw 503 can clamp an internal adjustment seat 4, thereby limiting a position of the rotating seat 5. The side of the rotating seat 5 is fixedly provided with a fourth threaded seat 502, and the fourth threaded seat 502 is threaded connected to the fourth positioning screw 503. The side of the rotating seat 5 is set as a plane, rendering an installation of the fourth threaded seat 502 more convenient. A through hole corresponding to the fourth positioning screw 503 is provided on an inner side of the rotating seat 5, so that an end of the fourth positioning screw 503 can pass through the adjustment seat 4 for clamping, thereby limiting the position of the rotating seat 5. A knob is provided at the end of the fourth positioning screw 503 to control a rotation of the fourth positioning screw 503.

In this embodiment, a bottom of the support column 101 is fixedly provided with a first annular rotating plate 106, and a middle of a top of the base 2 is fixedly provided with an installation seat 201. An interior of the installation seat 201 is provided with a first rotating groove 202 that cooperates with the first rotating plate 106. A rotation of the column 1 is guided by a rotation cooperation between the first rotating groove 202 and the first rotating plate 106. One side of the installation seat 201 is fixedly provided with a first threaded seat 203, and the side of the installation seat 201 is set as a plane, rendering it more convenient to install the first threaded seat 203. An internal thread of the first threaded seat 203 is provided with a first positioning screw 204, and an end of the first positioning screw 204 is fixedly provided with a knob for controlling a rotation of the first positioning screw. An inner side of installation seat 201 is provided with a through hole corresponding to the first positioning screw 204. When tightening the first positioning screw 204, by a thread cooperation of first positioning screw 204 and first threaded seat 203, the end of the first positioning screw 204 can pass through and clamp the support column 101.

In this embodiment, one surface of the adjustment column 103 is provided with a guide groove 105, and the adjustment seat 4 is sleeved on an outer side of the adjustment column 103. A top of the guide groove 105 is penetrated, so that the adjustment seat 4 can be quickly disassembled and installed from the top of the adjustment column 103, and the plurality of storage trays 7 can be installed. An inner side of the adjustment seat 4 is provided with a guide block 401 that cooperates with the guide groove 105. A sliding fit between the guide block 401 and the guide groove 105 guides a movement of the adjustment seat 4, and renders the adjustment seat 4 can only slide up and down along the guide groove 105 to adjust the height of the storage tray 7.

In this embodiment, the support arm 6 includes a support frame 601 and a support plate 604. The support frame 601 is rotatably provided on one side of the rotating seat 5, so that the support arm 6 can be folded to one side of the column 1 when not in use, reducing the occupied space. The support plate 604 is connected to an interior of the support frame 601, and an inner side of the support frame 601 is provided with a sliding groove. One side of the support plate 604 is provided with a slider that cooperates with the sliding groove. A sliding fit between the sliding groove and the slider guides a movement of the support plate 604. One side of the support plate 604 and one side of the support frame 601 are both provided with a plurality of second mounting holes 605, and adjacent second mounting holes 605 are connected to a second mounting bolt 606, so as to adjust a position of the support plate 604 inside the support frame 601, the second mounting holes 605 on the support plate 604 are aligned with the second mounting holes 605 on the support frame 601, and adjacent second mounting holes 605 are connected through the second mounting bolt 606, thereby fixing a connection between the support frame 601 and the support plate 604 and limiting a length of the support arm 6. One end of the support plate 604 away from the adjustment column 103 is fixedly provided with a fixing frame 607, and a top of the fixing frame 607 is fixedly provided with a fixing seat 608. A middle of a bottom of the storage tray 7 is provided with an installation groove corresponding to the fixing seat 608, and the fixing seat 608 is embedded in the installation groove to preliminarily limit a position of the storage tray 7. The fixing seat 608 is connected to the bottom of the storage tray 7 by a fixing screw, and the position of the storage tray 7 is further limited, and disassembly and assembly are facilitated.

In this embodiment, one side of the rotating seat 5 is fixedly provided with a connection seat 504, one end of the support frame 601 close to the adjustment column 103 is fixedly provided with a fifth positioning screw 602. A through hole corresponding to the fifth positioning screw 602 is provided on one surface of the connection seat 504 to limit a position of the support arm 6 and enable the support arm 6 to be rotated and folded to one side of the column 1. One surface of the fifth positioning screw 602 is threaded connected with a locking nut 603, and the support arm 6 between the connection seats 504 is clamped to limit its position under a thread cooperation of the locking nut 603 and the fifth positioning screw 602.

In this embodiment, a contraction groove 609 is provided on one side of the rotating seat 5 and located below the support frame 601. An interior of the contraction groove 609 is provided with a limit seat 6010. When it is necessary to fold the support arm 6, the limit seat 6010 is pressed into the interior of the contraction groove 609 to remove a support for the bottom of the support arm 6, so that the support arm 6 can be rotated and folded to one side of the column 1. The limit seat 6010 is a T shape. Two ends of the limit seat 6010 are connected to an inner side of the contraction groove 609 through a connection spring 6011. Under an action of the connection spring 6011, the limit seat 6010 can automatically pop out to support the bottom of the support arm 6. Thus, the position of the support arm 6 is further limited to stabilize the position of the storage tray 7, and to prevent the movement of the support arm 6 when preventing items inside the storage tray 7.

Working principle: firstly, a clamping thickness of the clamp seat 3 is adjusted, the first mounting bolt 308 between the side plate 301 and the bottom plate 302 is removed, the position of the bottom plate 302 is adjusted through the sliding fit between the slider and the sliding groove, thereby adjusting a clamping space between the bottom of the bottom plate 302 and the base 2. Then, the clamp seat 3 is clamped on the desktop, the second positioning screw 304 is driven to rotate by rotating the operating handle 306. Under the thread fit between the second positioning screw 304 and the second threaded seat 303, the clamp plate 305 is driven to move, and the clamp seat 3 is stably clamped on the desktop.

Next, the adjustment column 103 is rotated and the sliding fit between the threaded groove 104 and the external thread 102 is used to adjust a height of the adjustment column 103, thereby adjusting an overall height of the storage tray 7. Then, the adjustment seat 4 with the storage tray 7 is sleeved on the surface of the adjustment column 103 under the sliding fit between the guide block 401 and the guide groove 105, and a support height of each storage tray 7 is adjusted. After an adjustment is completed, the third positioning screw 403 is tightened, and the threaded fit between the third positioning screw 403 and the third threaded seat 402 is used to clamp an internal adjustment column 103, thereby limiting the position of the adjustment seat 4.

Then, the rotation cooperation between the first rotating groove 202 and the first rotating plate 106 is used, the column 1 is rotated at an angle to adjust the overall rotation direction of the storage tray 7 on the surface of the column 1. After the adjustment is completed, the first positioning screw 204 is tightened, and the internal support column 101 is clamped by the thread cooperation between the first positioning screw 204 and the first threaded seat 203, thereby clamping and limiting the position of the support column 101 to prevent it from rotating. When it is necessary to adjust the height of the storage tray 7 separately, the fourth positioning screw 503 is loosened to release the limitation on the rotating seat 5. The rotation cooperation between the second rotating groove 501 and the second rotating plate 404 is used to drive the rotating seat 5 to rotate, thereby adjusting a rotation direction of the storage tray 7. After adjustment, the fourth positioning screw 503 is tighten, by using the thread cooperation of the fourth positioning screw 503 and the fourth threaded seat 502, the internal adjustment seat 4 is clamped, the position of the rotating seat 5 is limited to prevent it from rotating.

When adjusting a placement position of the storage tray 7, the second mounting bolt 606 on the support arm 6 is dissembled, and the sliding fit between the sliding groove on the support frame 601 and the slider on the support plate 604 is used to slide the position of the support plate 604, thereby adjusting the position of the storage tray 7, so that the second mounting hole 605 on the support frame 601 corresponds to the second mounting hole 605 on the support plate 604, and the second mounting bolt 606 between adjacent second mounting holes 605 is installed, thereby limiting the position between the support frame 601 and the support plate 604.

When not in use, the support arm 6 is adjusted to a shortest length and the locking nut 603 on the fifth positioning screw 602 is loosened to release a limitation on the support arm 6. Then, the limit seat 6010 is pressed into the contraction groove 609 to release the support for the support arm 6, the support arm 6 is rotated to the side of the column 1 and fold it so as to reduce its occupied space.

The above embodiments only show some embodiments of the present disclosure, and their descriptions are more specific and detailed, but should not be understood as limiting the scope of the disclosure. It should be noted that for those skilled in the art, several modifications and improvements can be made without departing from the inventive concept, which are within the protection scope of the present disclosure. Therefore, the protection scope of the present disclosure should be based on the appended claims.

What is claimed is:

1. A rotatable lifting storage device, comprising a column, wherein a bottom end of the column is provided with a base, a bottom end of the base is provided with a clamp seat;
   one surface of the column is provided with an adjustment seat that is capable of sliding up and down;
   one side thread of the adjustment seat is provided with a third positioning screw, one surface of the adjustment seat is rotatably provided with a rotating seat,
   one side of the rotating seat is provided with a support arm, one end of the support arm away from the column is provided with a storage tray;
   a top of the storage tray is fixedly provided with a protective frame, and the storage tray is provided with a protective pad inside;
   wherein the column is composed of a support column and an adjustment column;
   wherein the support arm comprises a support frame and a support plate,
   the support frame is rotatably provided on one side of the rotating seat,
   the support plate is slidably connected to an interior of the support frame;
   one side of the support plate and one side of the support frame are provided with a plurality of second mounting holes;
   adjacent two second mounting holes are connected to a second mounting bolt;
   one end of the support plate away from the adjustment column is fixedly provided with a fixing frame,
   a top of the fixing frame is fixedly provided with a fixing seat,
   a middle of a bottom of the storage tray is provided with an installation groove corresponding to the fixing seat; the fixing seat is embedded inside the installation groove, and the fixing seat is connected to a bottom end of the storage tray through a fixing screw.

2. The rotatable lifting storage device according to claim 1, wherein the clamp seat comprises a side plate and a bottom plate,
   the side plate is fixedly provided on one side of the base, the bottom plate is a L-shape,
   one side of the bottom plate is slidably connected to the side plate,
   a bottom end of the bottom plate is fixedly provided with a second threaded seat, an internal thread of the second threaded seat is provided with a second positioning screw;
   a top end of the second positioning screw is fixedly provided with a clamp plate, and a bottom end of the second positioning screw is fixedly provided with an operating handle.

3. The rotatable lifting storage device according to claim 2, wherein one surface of the side plate and one side of the bottom plate are provided with a plurality of first mounting holes,
   adjacent first mounting holes are connected by a first mounting bolt.

4. The rotatable lifting storage device according to claim 1, wherein one side of the adjustment seat is fixedly provided with a third threaded seat, and the third threaded seat is threaded connected to the third positioning screw;
   one surface of the adjustment seat is fixedly provided with a second annular rotating plate,
   an interior of the rotating seat is provided with a second rotating groove that cooperates with the second rotating plate;
   one surface thread of the rotating seat is provided with a fourth positioning screw, one side of the rotating seat is fixedly provided with a fourth threaded seat,
   the fourth threaded seat is threaded connected to the fourth positioning screw.

5. The rotatable lifting storage device according to claim 1, wherein
   the support column is rotatably provided in a middle of a top of the base;
   one surface of the support column is provided with an external thread, and a bottom of the adjustment column is provided with a threaded groove that is threaded connected to the external thread.

6. The rotatable lifting storage device according to claim 5, wherein a bottom of the support column is fixedly provided with a first annular rotating plate;
   a middle of a top of the base is fixedly provided with an installation seat;
   an interior of the installation seat is provided with a first rotating groove that cooperates with the first rotating plate;
   one side of the installation seat is fixedly provided with a first threaded seat, and an internal thread of the first threaded seat is provided with a first positioning screw.

7. The rotatable lifting storage device according to claim 5, wherein one surface of the adjustment column is provided with a guide groove;
   the adjustment seat is sleeved on an outer side of the adjustment column;
   an inner side of the adjustment seat is provided with a guide block that cooperates with the guide groove.

8. The rotatable lifting storage device according to claim 1, wherein one side of the rotating seat is fixedly provided with a connection seat,
   one end of the support frame close to the adjustment column is fixedly provided with a fifth positioning screw;
   one surface of the connection seat is provided with a through hole corresponding to the fifth positioning screw, and one surface of the fifth positioning screw is threaded connected to a locking nut.

9. The rotatable lifting storage device according to claim 1, wherein a contraction groove is provided on one side of the rotating seat and below the support frame;
   a limit seat is provided in the contraction groove, and the limit seat is a T-shape,
   two ends of the limit seat are connected to an inner side of the contraction groove through a connection spring.

* * * * *